United States Patent
Pard et al.

(10) Patent No.: US 9,828,064 B2
(45) Date of Patent: Nov. 28, 2017

(54) CONTINUOUSLY VARIABLE TRANSMISSION MOUNTING ASSEMBLY

(71) Applicant: BOMBARDIER RECREATIONAL PRODUCTS INC., Valcourt (CA)

(72) Inventors: Jean-Sebastien Pard, Tingwick (CA); Mathieu Gauthier, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 14/838,493

(22) Filed: Aug. 28, 2015

(65) Prior Publication Data
US 2016/0059929 A1 Mar. 3, 2016

Related U.S. Application Data

(60) Provisional application No. 62/043,681, filed on Aug. 29, 2014.

(51) Int. Cl.
*B62M 27/02* (2006.01)

(52) U.S. Cl.
CPC ....... *B62M 27/02* (2013.01); *B62M 2027/023* (2013.01)

(58) Field of Classification Search
CPC ........................ B62M 27/02; B62M 2027/023
See application file for complete search history.

(56) References Cited

U.S. PATENT DOCUMENTS

| 4,893,692 | A | * | 1/1990 | Smith | B62M 27/02 180/190 |
|---|---|---|---|---|---|
| 5,607,026 | A | * | 3/1997 | Rioux | B62M 27/02 180/190 |
| 5,685,387 | A | * | 11/1997 | Rioux | B62M 27/02 180/190 |
| 6,032,754 | A | * | 3/2000 | Izumi | B62M 27/02 180/190 |
| 7,083,024 | B2 | | 8/2006 | Bergman et al. | |
| 7,997,372 | B2 | | 8/2011 | Maltais | |
| 8,037,961 | B2 | | 10/2011 | Fecteau | |
| 8,584,781 | B1 | | 11/2013 | Gauthier et al. | |
| 9,016,420 | B1 | * | 4/2015 | Gauthier | B62M 27/02 180/190 |
| 2002/0129982 | A1 | | 9/2002 | Harle et al. | |
| 2004/0182624 | A1 | * | 9/2004 | Yatagai | B62M 27/02 180/190 |

(Continued)

OTHER PUBLICATIONS

Redline Performance Products Inc., 800 Revolt brochure, 2003, Vista, USA.

*Primary Examiner* — Tony H Winner
*Assistant Examiner* — Gabriela C Craciun
(74) *Attorney, Agent, or Firm* — BCF LLP

(57) ABSTRACT

A vehicle has a frame, an engine connected to the frame, an output shaft driven by the engine, a bracket resiliently mounted to the engine, a countershaft rotationally supported by the bracket, a driving pulley disposed on the output shaft and rotating therewith, a driven pulley disposed on the countershaft and rotating therewith, a drive belt looped around the driving and driven pulleys to transfer torque from the driving pulley to the driven pulley, the driving pulley, the driven pulley and the drive belt together forming a continuously variable transmission, and at least one ground engaging member operatively connected to the countershaft.

28 Claims, 11 Drawing Sheets

(56) References Cited

U.S. PATENT DOCUMENTS

| | | | |
|---|---|---|---|
| 2010/0288572 A1 | 11/2010 | Maltais | |
| 2011/0192667 A1* | 8/2011 | Conn | B62J 25/00 |
| | | | 180/190 |
| 2013/0032418 A1* | 2/2013 | Ripley | B62M 27/02 |
| | | | 180/190 |
| 2015/0114343 A1* | 4/2015 | Bernier | F02D 9/02 |
| | | | 123/337 |
| 2016/0069434 A1* | 3/2016 | Aitcin | F16H 55/563 |
| | | | 180/190 |

* cited by examiner

CONTINUOUSLY VARIABLE TRANSMISSION MOUNTING ASSEMBLY

CROSS-REFERENCE

The present application claims priority to U.S. Patent Application No. 62/043,681, filed Aug. 29, 2014.

FIELD OF TECHNOLOGY

The present technology relates to a continuously variable transmission mounting assembly and vehicles incorporating same.

BACKGROUND

Snowmobiles are typically provided with a continuously variable transmission (CVT) to transmit power from the engine of the vehicle to the endless drive track, while changing the speed ratio between the engine and the endless drive track. Advantages of CVTs include smoother acceleration and improved fuel efficiency when compared to other types of transmissions.

Conventionally, snowmobiles have a pair of skis and an endless drive track for propelling the snowmobile, both of which are mounted to a frame of the snowmobile. The frame includes an engine compartment which conventionally has left and right sides, a bottom, a rear (bulkhead), and a front portion. The engine compartment supports power pack components such as an engine, an exhaust pipe, a muffler, a reduction gearing, and a CVT. The frame also includes a tunnel rearward of the engine compartment below which the endless drive track is disposed. The CVT has a driving pulley mounted to an output shaft of the engine, a driven pulley, and a belt looped around the two pulleys. The driven pulley is mounted to a countershaft and has a portion thereof which extends next to a side of the tunnel. The countershaft is operatively connected to the endless drive track so as to drive the endless drive track. U.S. Pat. No. 7,997,372, issued Aug. 16, 2011, the entirety of which is incorporated herein by reference, describes the above features of a snowmobile in more details.

The engine is usually mounted to the engine compartment through rubber mounts to reduce the transmission of vibrations from the engine to the frame. As a result, during operation, the engine moves relative to the frame. Therefore, the engine's output shaft, the driving pulley and their common axis of rotation also move relative to the frame. The countershaft is rigidly supported near the engine compartment through bearings. As such its axis of rotation, which is also the axis of rotation of the driven pulley, does not move relative to the frame. As would be understood, this means that the axis of rotation of the driving pulley moves relative to the axis of rotation of the driven pulley. Therefore, the tension and alignment of the belt looped around the driving and driven pulleys changes due to these variations between the axes of rotation of the pulleys. This negatively affects the transfer of torque from the driving pulley to the driven pulley and may cause premature wear of the belt.

One possible solution to the above consists in mounting the engine to the engine compartment by using stiffer engine mounts. However, this results in more vibrations being transferred from the engine to the frame.

Therefore, it would be desirable to have a vehicle having a CVT mounting assembly which helps reduce the amount of vibration transferred to the frame.

It would also be desirable to have a vehicle having a CVT mounting assembly which reduces the variations in the distance between the axes of rotation of the driving and driven pulleys resulting from engine movement relative to the frame of the snowmobile.

SUMMARY

It is an object of the present technology to ameliorate at least some of the inconveniences present in the prior art.

According to an aspect of the present technology, there is provided a vehicle having a frame, an engine connected to the frame, an output shaft driven by the engine, a bracket resiliently mounted to the engine, a countershaft rotationally supported by the bracket, a driving pulley disposed on the output shaft and rotating therewith, a driven pulley disposed on the countershaft and rotating therewith, a drive belt looped around the driving and driven pulleys to transfer torque from the driving pulley to the driven pulley, the driving pulley, the driven pulley and the drive belt together forming a continuously variable transmission, and at least one ground engaging member operatively connected to the countershaft.

In some implementations of the present technology, at least one resilient mount mounts the bracket to the engine.

In some implementations of the present technology, the at least one resilient mount is two resilient mounts disposed on opposite sides of a rotation axis of the countershaft In some implementations of the present technology, the bracket defines an aperture and the countershaft passes through the aperture.

In some implementations of the present technology, a bearing is disposed in the aperture radially between the countershaft and the bracket.

In some implementations of the present technology, the bracket is a first bracket. The vehicle also has a second bracket rigidly connected to the engine. The first bracket is resiliently mounted to the second bracket.

In some implementations of the present technology, the first bracket defines a first aperture, the second bracket defines a second aperture coaxial with the first aperture, and the countershaft passes through the first and second apertures.

In some implementations of the present technology, a bearing is disposed in the first aperture radially between the countershaft and the first bracket.

In some implementations of the present technology In some implementations, the at least one resilient mount has a damper, a first plate disposed between the damper and the first bracket, and a second plate disposed between the damper and the second bracket. The first bracket is fastened to the first plate and the second bracket is fastened to the second plate.

In some implementations of the present technology, the at least one resilient mount also has an internally threaded stopper connected to the first plate and extending through the damper and the second plate, and at least one threaded stud connected to and extending from the second plate. The at least one stud extends through the second bracket. The vehicle also has at least one threaded fastener passing through the first bracket and fastened to the internally threaded stopper of the at least one resilient mount to fasten the first bracket to the at least one resilient mount, and at least one nut fastened to the at least one threaded stud of the at least one resilient mount to fasten the second bracket to the at least one resilient mount.

In some implementations of the present technology, at least one bumper is disposed between the internally threaded stopper of the at least one resilient mount and the second bracket. A material of the at least one bumper is less resilient than a material of the damper of the at least one resilient mount.

In some implementations of the present technology, the at least one resilient mount has a damper, and a stopper extending from the damper between the damper and the second bracket.

In some implementations of the present technology, at least one bumper is disposed between the threaded stopper of the at least one resilient mount and the second bracket. A material of the at least one bumper is less resilient than a material of the damper of the at least one resilient mount.

In some implementations of the present technology, the at least one resilient mount is two resilient mounts disposed on opposite sides of a rotation axis of the countershaft.

In some implementations of the present technology, the driving and driven pulleys are disposed on a first side of the engine. The vehicle also has a reduction gearing operatively connected to the countershaft on a second side of the engine opposite the first side.

In some implementations of the present technology, a drive axle operatively connects the reduction gearing to the at least one ground engaging member.

In some implementations of the present technology, the countershaft is connected to the reduction gearing via crown splines.

In some implementations of the present technology, the countershaft is disposed rearward and upward of the output shaft.

In some implementations of the present technology, the frame has an engine compartment, and a tunnel rearward of the engine compartment. The engine is disposed in the engine compartment. The at least one ground engaging member is an endless drive track disposed below the tunnel. The vehicle also has a front suspension connected to the frame, and at least one ski connected to the front suspension.

For purposes of this application, terms related to spatial orientation such as forward, rearward, upward, downward, left, and right, are as they would normally be understood by a driver of the vehicle sitting thereon in a normal riding position. Explanation and/or definitions of terms provided in the present application take precedence over explanations and/or definitions of these terms that may be found in the documents incorporated herein by reference.

Implementations of the present technology each have at least one of the above-mentioned object and/or aspect, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Aspects of the present continuously variable transmission (CVT) mounting assembly will be described with respect to a snowmobile 10. However it is contemplated that aspects of the present CVT mounting assembly could also be applied to other types of vehicles provided with CVTs.

Figure 1:
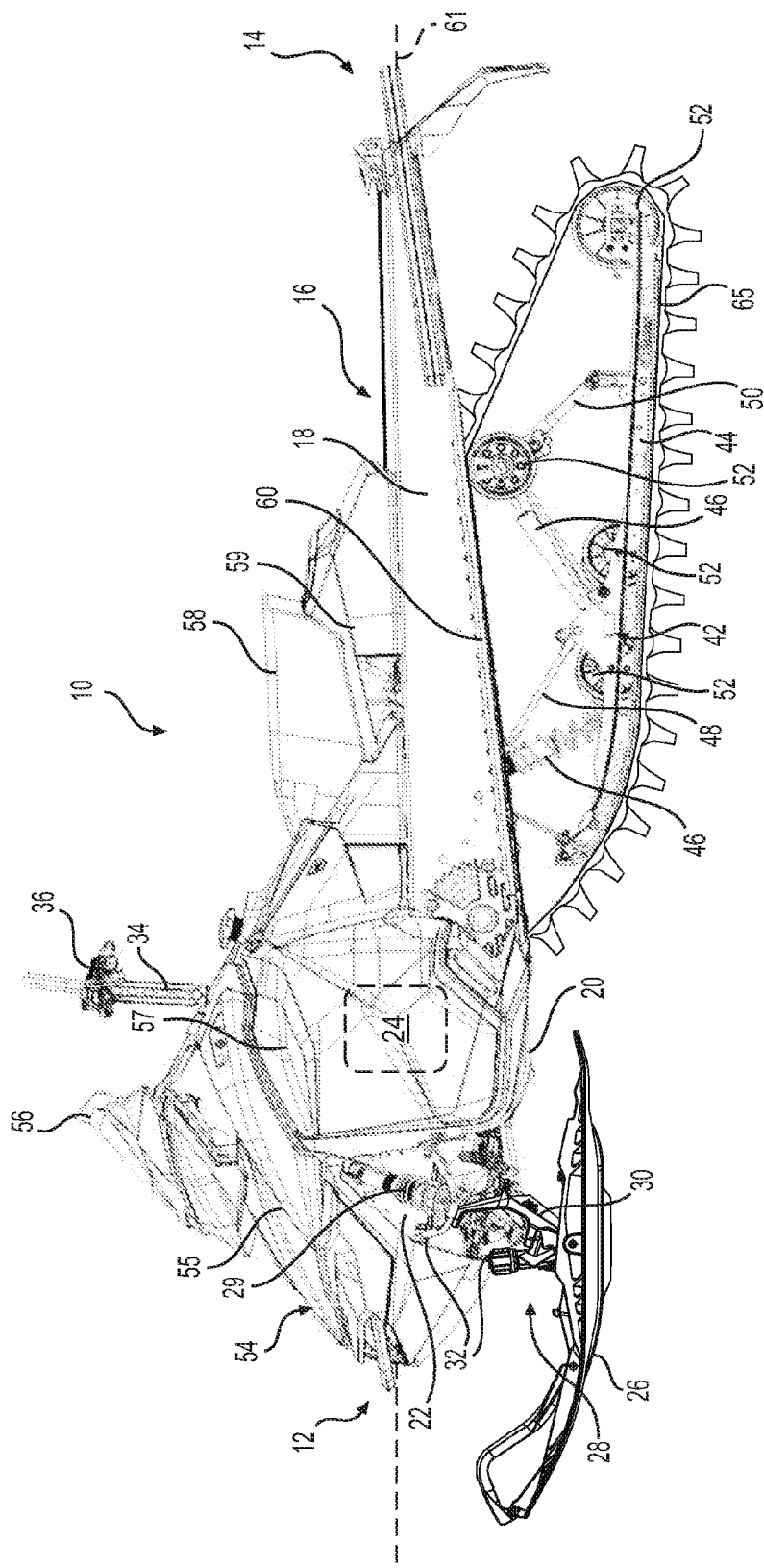
FIG. 1 is a left side elevation view of a snowmobile.

As seen in FIG. 1, the snowmobile 10 includes a forward end 12 and a rearward end 14 that are defined consistently with a travel direction of the snowmobile 10. The snowmobile 10 includes a frame 16 that includes a tunnel 18, an engine compartment 20 and a front suspension module 22 as described in greater detail below. The tunnel 18 generally consists of one or more pieces of sheet metal bent to form an inverted U-shape. The tunnel 18 extends rearwardly along the longitudinal centerline 61 of the snowmobile 10 and is connected at the front to the engine compartment 20. An engine 24, which is schematically illustrated in FIG. 1, is carried by the engine compartment 20 of the frame 16.

Two skis 26 are positioned at the front of the snowmobile 10 and are attached to the front suspension module 22 through a pair of front suspension assemblies 28. Each front suspension assembly 28 includes a ski leg 30, a pair of A-arms 32 and a shock absorber 29. Other types of front suspension assemblies 28 are contemplated, such as a swing-arm or a telescopic suspension. A steering device in the form of a handlebar 36, positioned forward of a rider, is attached to the upper end of a steering column 34 to allow the rider to rotate the ski legs 30 and thus the skis 26, in order to steer the snowmobile 10. U.S. Pat. No. 8,037,961, issued Oct. 18, 2011, the entirety of which is incorporated herein by reference, provides additional details regarding a steering assembly and front suspension assemblies suitable for the snowmobile 10.

An endless drive track 65 is positioned at the rear of the snowmobile 10. The endless drive track 65 is disposed generally under the tunnel 18, and is operatively connected to the engine 24 as will be described in greater detail below. The endless drive track 65 is driven to run about a rear suspension assembly 42 for propelling the snowmobile 10. The rear suspension assembly 42 includes a pair of slide rails 44 in sliding contact with the endless drive track 65. The rear suspension assembly 42 also includes shock absorbers 46 which may further include a coil spring surrounding the individual shock absorbers 46. Suspension arms 48 and 50 are provided to attach the slide rails 44 to the frame 16. A plurality of idler wheels 52 are also provided in the rear suspension assembly 42.

At the front end 12 of the snowmobile 10, fairings 54 enclose the engine 24, thereby providing an external shell that not only protects the engine 24, but also make the snowmobile 10 more aesthetically pleasing. The fairings 54 include a hood 55 and side panels 57 (one on each side) that can be opened to allow access to the engine 24 when this is required, for example, for inspection or maintenance of the engine 24. In the particular snowmobile 10 shown in FIG. 1, the side panels 57 can be opened along a vertical axis to swing away from the snowmobile 10. A windshield 56 is connected to the fairings 54 near the front end 12 of the snowmobile 10. Alternatively, the windshield 56 could be connected directly to the handlebar 36. The windshield 56 acts as a wind screen to lessen the force of the air on the rider while the snowmobile 10 is moving.

A straddle-type seat 58 is positioned on a fuel tank 59 of the snowmobile 10. The fuel tank 59 is positioned on top of the tunnel 18. A rear portion of the seat 58 may include a storage compartment or can be used to accommodate a passenger seat (not indicated). Two footrests 60 are positioned on opposite sides of the snowmobile 10 below the seat 58 to accommodate the driver's feet.

The configuration of engine compartment 20 will now be described with respect to FIG. 2. The engine compartment 20 includes a right side wall 62, a left side wall 64, and an engine compartment bottom 66. The side walls 62, 64 are generally vertical and generally parallel to the longitudinal centerline 61. The engine compartment bottom 66 is generally horizontal and extends transversely between and beyond the side walls 62, 66. A bulkhead (not shown) has one side connected to a rear portion of the right side wall 62, the other side connected to a rear portion of the left side wall 64, and a bottom connected to a rear portion of the engine compartment bottom 66. The right and left side walls 62, 64, the engine compartment bottom 66, and the bulkhead are made from bent sheet metal or by casting, and are connected to each other by fasteners such as rivets or bolts. The engine 24 is disposed transversely between the right and left side walls 62, 64 and forwardly of the bulkhead. The upper portion of the engine compartment 20 has a number of frame members (not shown) that form together a pyramidal-like structure that enhances the torsional and structural rigidity of the frame 16. The frame members are made of aluminum tubing, but other structures and materials are also contemplated. The engine compartment 20 has other elements and features not described herein for simplicity and clarity.

The tunnel 18 of the frame 16 is made of three parts. The tunnel 18 has a central tunnel portion 74, a right side tunnel portion 76, and a left side tunnel portion 78. The central tunnel portion 74 is disposed generally horizontally and has an integrated heat exchanger (not shown) that is used to cool the engine coolant. It is contemplated that the heat exchanger could be fastened to a bottom of the central tunnel portion 74 or could be disposed elsewhere on the frame 16. The front portion of the central tunnel portion 74 is connected to a rear portion of the bulkhead via fasteners. It is contemplated that the front portion of the central tunnel portion 74 could alternatively be connected to a rear portion of the bulkhead by welding or other means. The right and left side tunnel portions 76, 78 are disposed generally vertically and each have a footrest 60 extending outwardly from a bottom portion thereof. The right side tunnel portion 76 and the left side tunnel portion 78 are connected to the central tunnel portion 74 via flanges extending inwardly from a top of the side tunnel portions 76, 78.

A power pack for powering the endless drive track 65 will now be described with reference to FIGS. 2 to 7. The power pack includes, but is not limited to, the engine 24, a variable ratio belt transmission system, also known as a continuously variable transmission or CVT 100, a reduction gearing 102, and a countershaft 104.

The engine 24 is a two cylinder, two-cycle internal combustion engine. It is contemplated that the engine 24 could be of any other type, such as a four-cycle internal combustion engine. The engine 24 is disposed in the engine compartment 20 and rests on vibration dampers 106, 108 and 110 (FIGS. 2 to 4) to reduce the transmission of vibrations from the engine 24 to the frame 16. The vibration dampers 106, 108 and 110 are rubber mounts.

Figure 4:
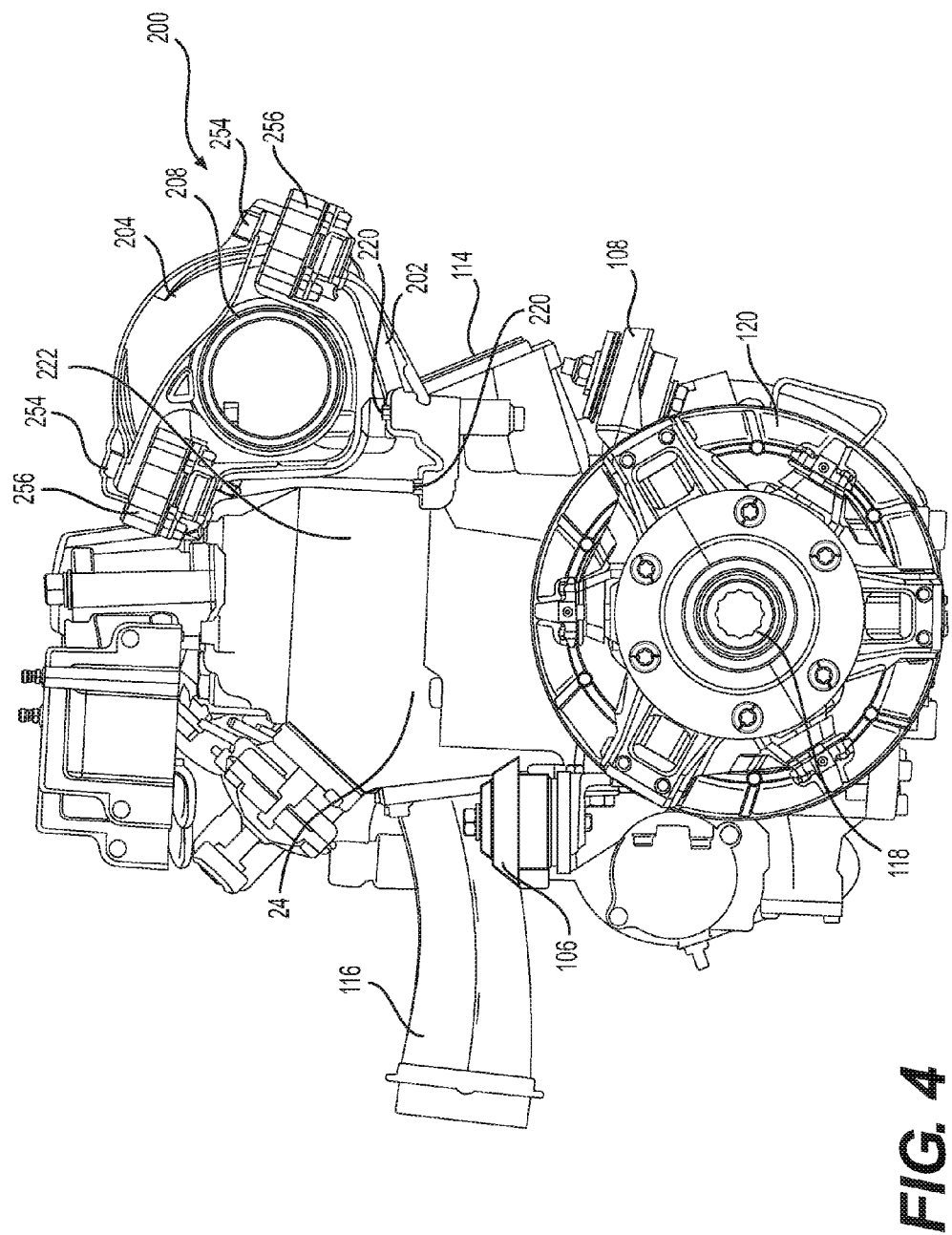
FIG. 4 is a left side elevation view of the components of FIG. 3, with the driven pulley of the CVT and the countershaft removed.
Figure 5:
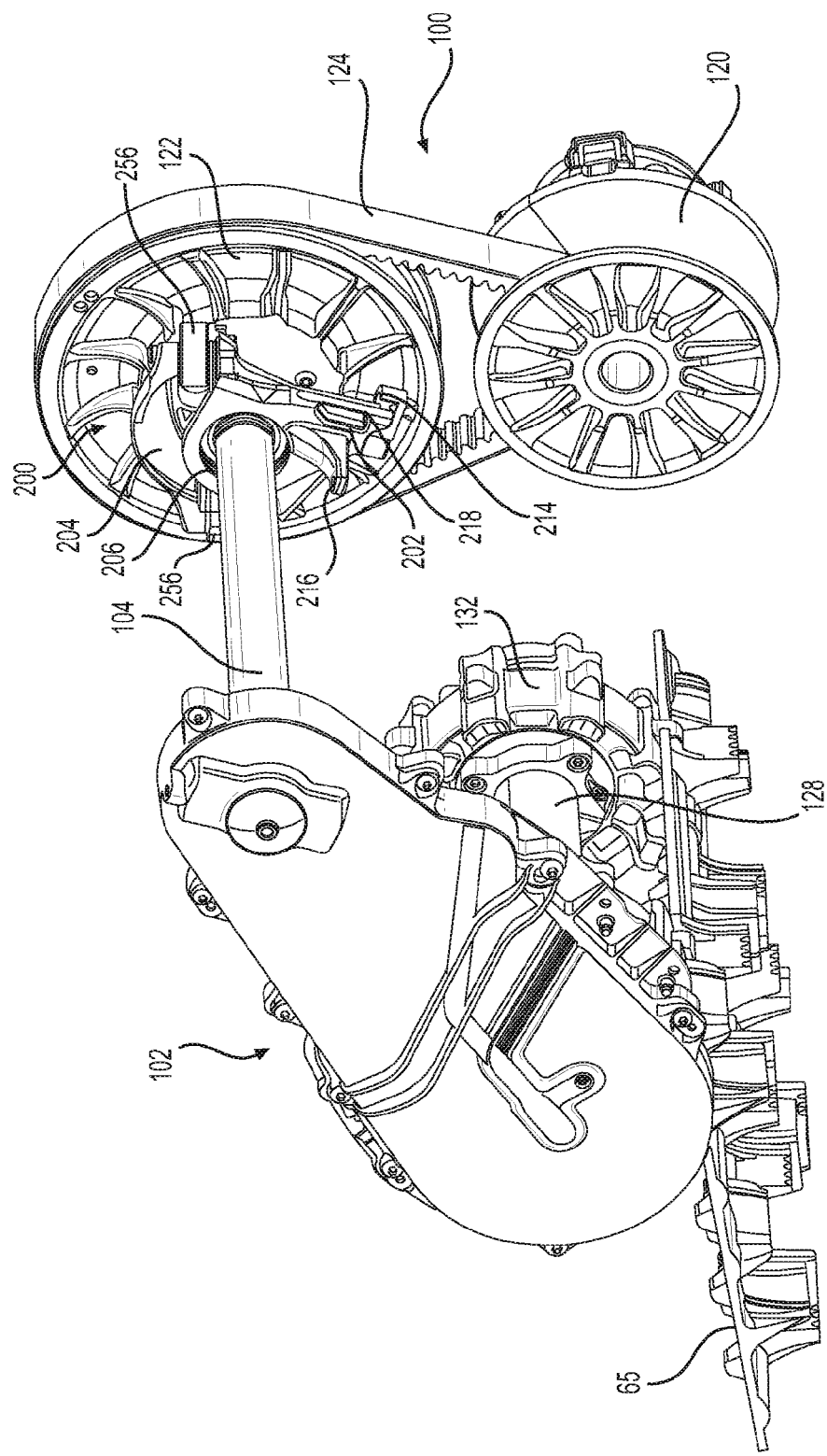
FIG. 5 is a perspective view taken from a front, right side of a portion of the endless drive track of the snowmobile and of the power pack of FIG. 2, with the engine removed.

As best seen in FIG. 4, the engine 24 has a plurality of air intakes 114 (one per cylinder) on a rear side thereof. An air intake manifold (not shown) is connected to the rear side of the engine 24 so as to fluidly communicate with the air intakes 114. Two throttle bodies (not shown) fluidly communicate with the air intake manifold. It is contemplated that only one throttle body could be used. The throttle bodies each comprise a valve (not shown) that controls the flow of air to the engine 24. It is contemplated that the throttle bodies could be replaced by one or more carburetors in an engine that does not have fuel injection. A plurality of exhaust ports (one per cylinder, not shown) is disposed on a front side of the engine 24. An exhaust manifold 116 is connected to the exhaust ports. The exhaust manifold is connected to a remainder of an exhaust system (not shown) to exhaust the gases from the combustion process.

The engine 24 drives an output shaft 118. In the present implementation, the output shaft 118 is integrally formed with the crankshaft (not shown) of the engine 24, but it is contemplated that the output shaft 118 could be separate from and driven by the crankshaft. The output shaft 118 rotates about a horizontally disposed axis that extends generally transversely to the longitudinal centerline 61 of the snowmobile 10.

The engine 24 includes other systems, such as the fuel and electrical systems, but these have not been illustrated or described herein for simplicity.

Figure 2:
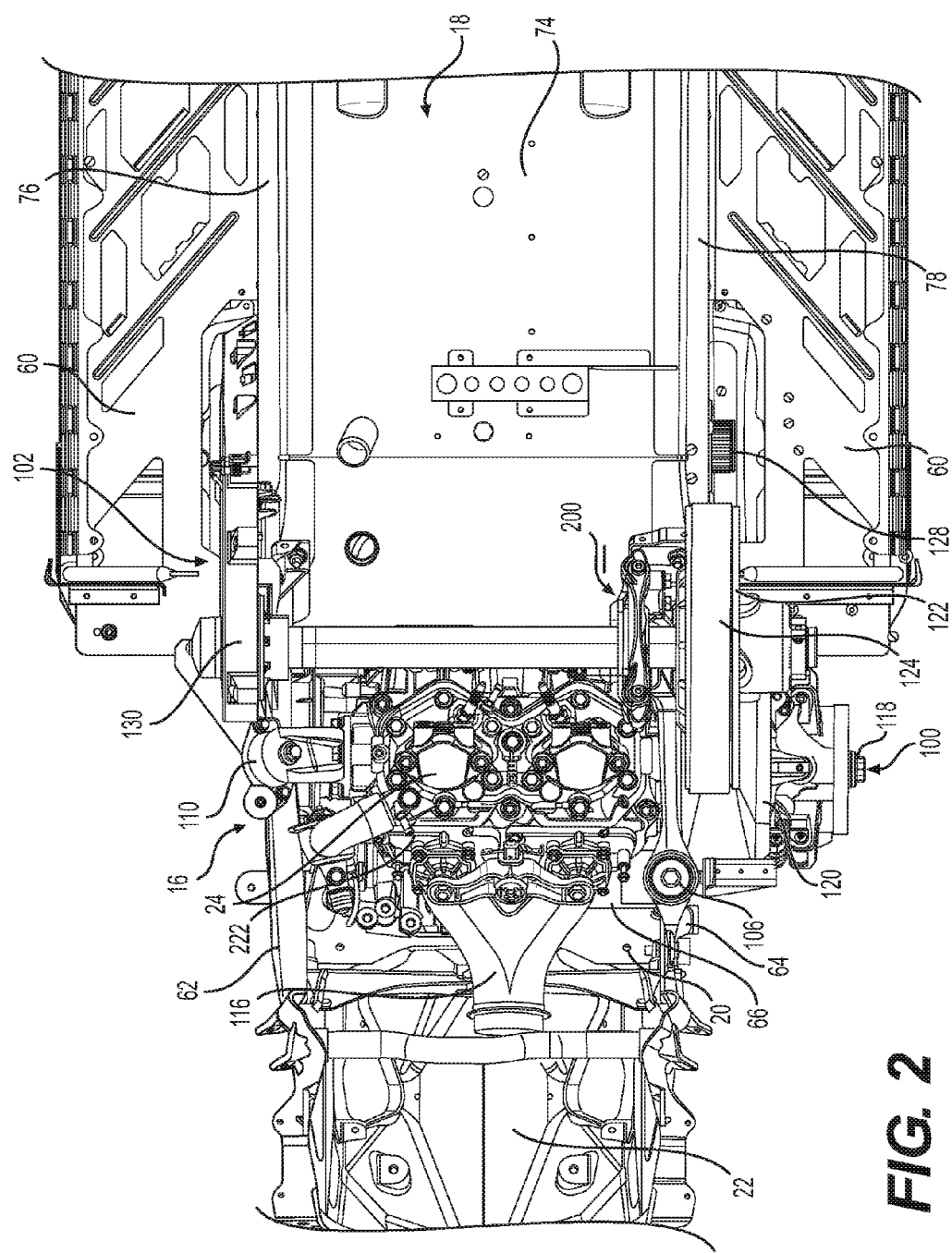
FIG. 2 is a top plan view of a forward portion of a frame and a power pack of the snowmobile of FIG. 1, with portions of the frame removed for clarity.
Figure 3:
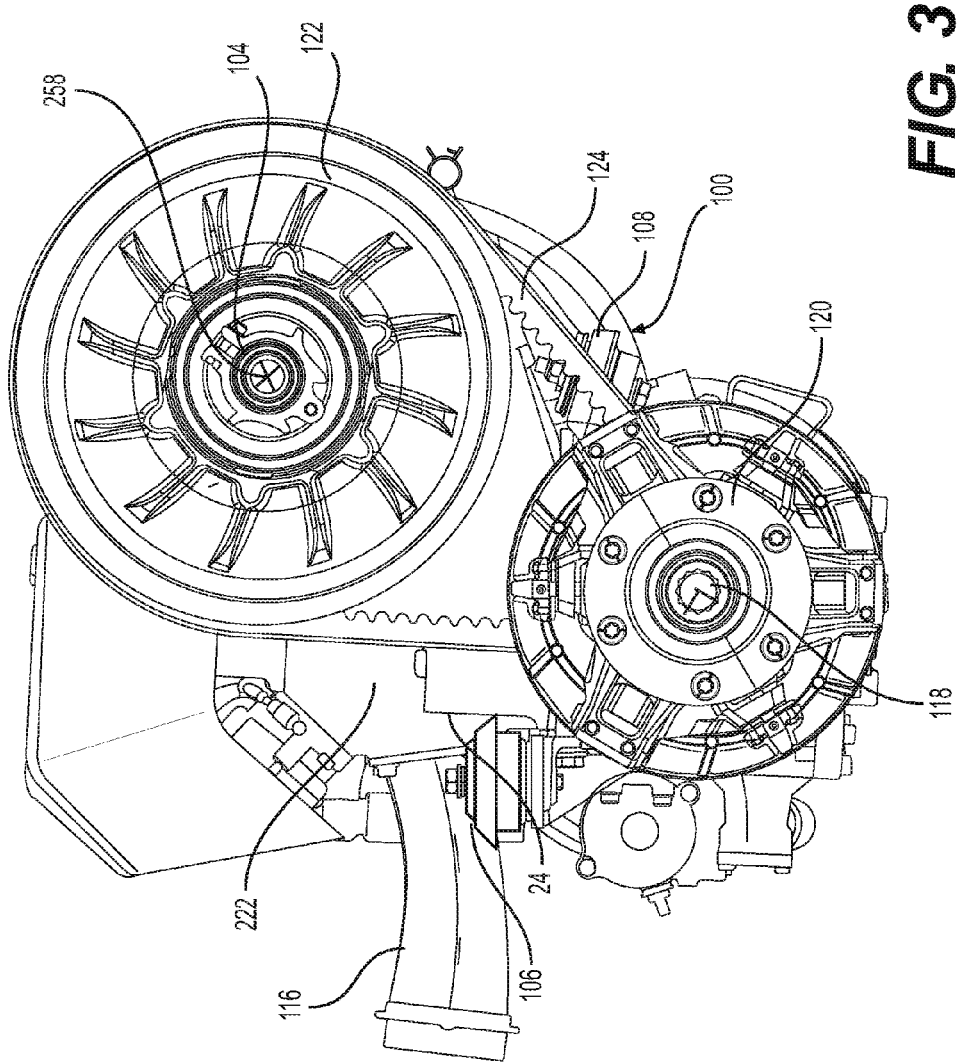
FIG. 3 is a left side elevation view of the engine, continuously variable transmission (CVT) and countershaft of the power pack of FIG. 2.

As can be seen in FIG. 2, the CVT 100 is disposed on a left side of the engine 24 and includes a driving pulley 120 coupled to rotate with the output shaft 118 of the engine 24, a driven pulley 122 coupled to the left end of the transversely mounted countershaft 104, and a drive belt 124 looped around the driving and driven pulleys 120, 122. The manner in which the countershaft 104 is supported in the engine compartment 20 will be described in greater detail below. As can be seen, the countershaft 104 traverses the width of the engine compartment 20. The countershaft 104 is disposed rearwardly of the engine 24, vertically higher than the air intakes. The countershaft 104 is also disposed vertically higher than the tunnel 18.

The driving pulley 120 of the CVT 100 is coupled to rotate with the output shaft 118 of the engine 24 and includes a pair of opposed frustoconical belt drive sheaves (one fixed sheave and one moving sheave) between which the drive belt 124 is located. The sheaves are biased apart, and the driving pulley 120 incorporates a centrifugally operated mechanism that acts to urge the moving sheave towards the fixed sheave with a force that increases with increasing output shaft speed so that as the engine speed increases, the reduction ratio of the CVT 100 decreases. The driven pulley 122 is coupled to rotate with the countershaft 104 and includes a pair of frustoconical belt drive sheaves between which the drive belt 124 is located. The driven pulley 122 reacts to the torque from the endless drive track 65 by separation of its sheaves which allows the drive belt 124 to engage the driven pulley 122 at a diameter that is progressively reduced as the torque increases or that is progressively increased as the torque decreases. When the driving pulley 120 increases its effective diameter, the driven pulley 122 decreases its effective diameter and vice versa, thus keeping the drive belt 124 in tension. The drive belt 124 is made of rubber, but it is contemplated that it could be made of other materials.

Figure 6:
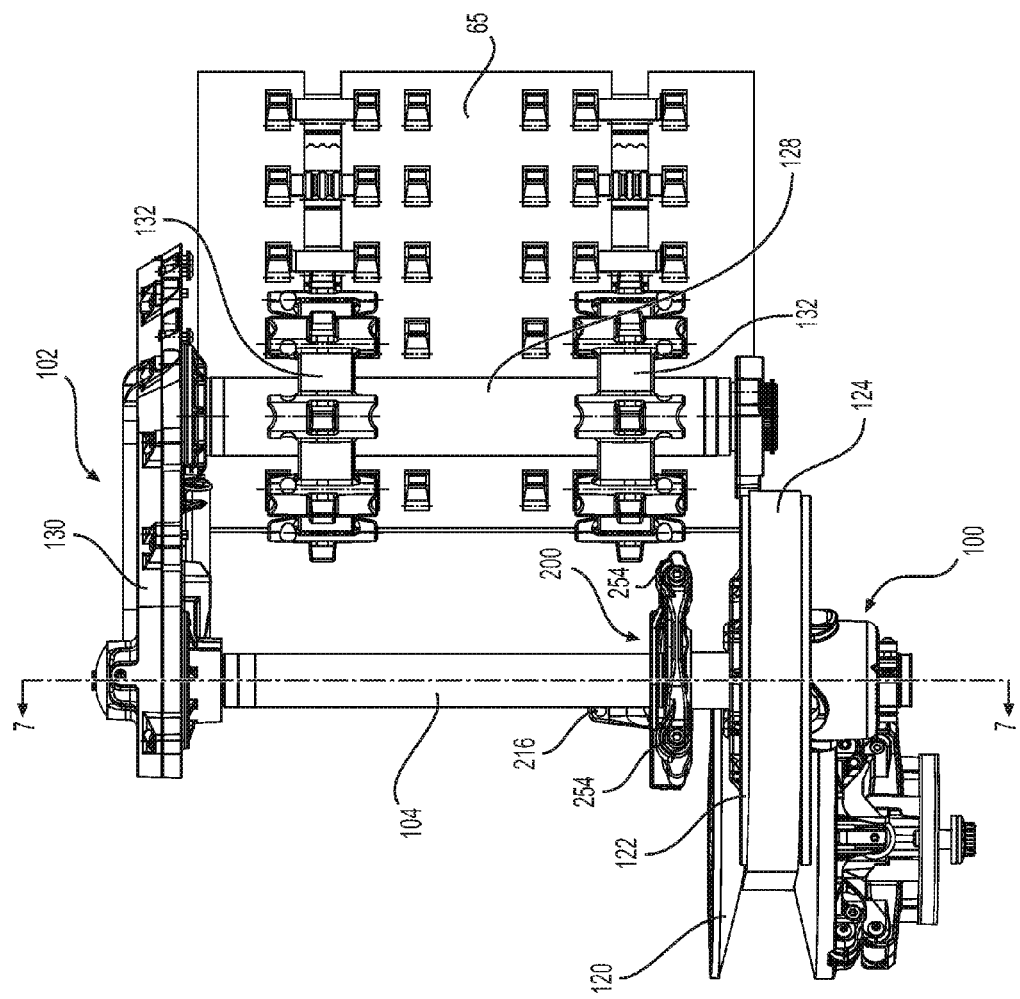
FIG. 6 is a top plan view of the components of FIG. 5.

A reduction gearing 102 is disposed on a right side of the engine 24. The right end of the countershaft 104 is connected to an input member of the reduction gearing 102. The input member of the reduction gearing 102 consists of a small sprocket 126 (see FIG. 7) connected to the countershaft 104 as will be described in greater detail below. An output member of the reduction gearing 102 is connected to a front drive axle 128 (FIG. 6). The output member consists of a sprocket (not shown) that is larger than the sprocket of the input member and is connected to the drive axle 128. The output member is driven via a chain (not shown) by the sprocket 126. It is also contemplated that the output member could be driven via gears by the input member. The input member, the output member, and the chain are enclosed within the housing 130 of the reduction gearing 102. The front drive axle 128 is disposed in the tunnel 18 and carries sprocket wheels 132 that form a driving connection with the endless drive track 65. The output shaft 118, the countershaft 104, and the front drive axle 128 are arranged such that the countershaft 104 is disposed rearward and upward of the output shaft 118 and forward and upward of the front drive axle 128.

It is contemplated that the reduction gear 102 could be disposed on the left side of the engine 24 and that the CVT 100 could be disposed on the right side of the engine 24.

The driving pulley 120 rotates at the same speed as the output shaft 118 of the engine 24. The speed of rotation of the countershaft 104 is determined in accordance with the instantaneous ratio of the CVT 100. The drive axle 128 rotates at a lower speed than the countershaft 104 since the reduction gearing 102 has a reduction ratio.

Figure 7:
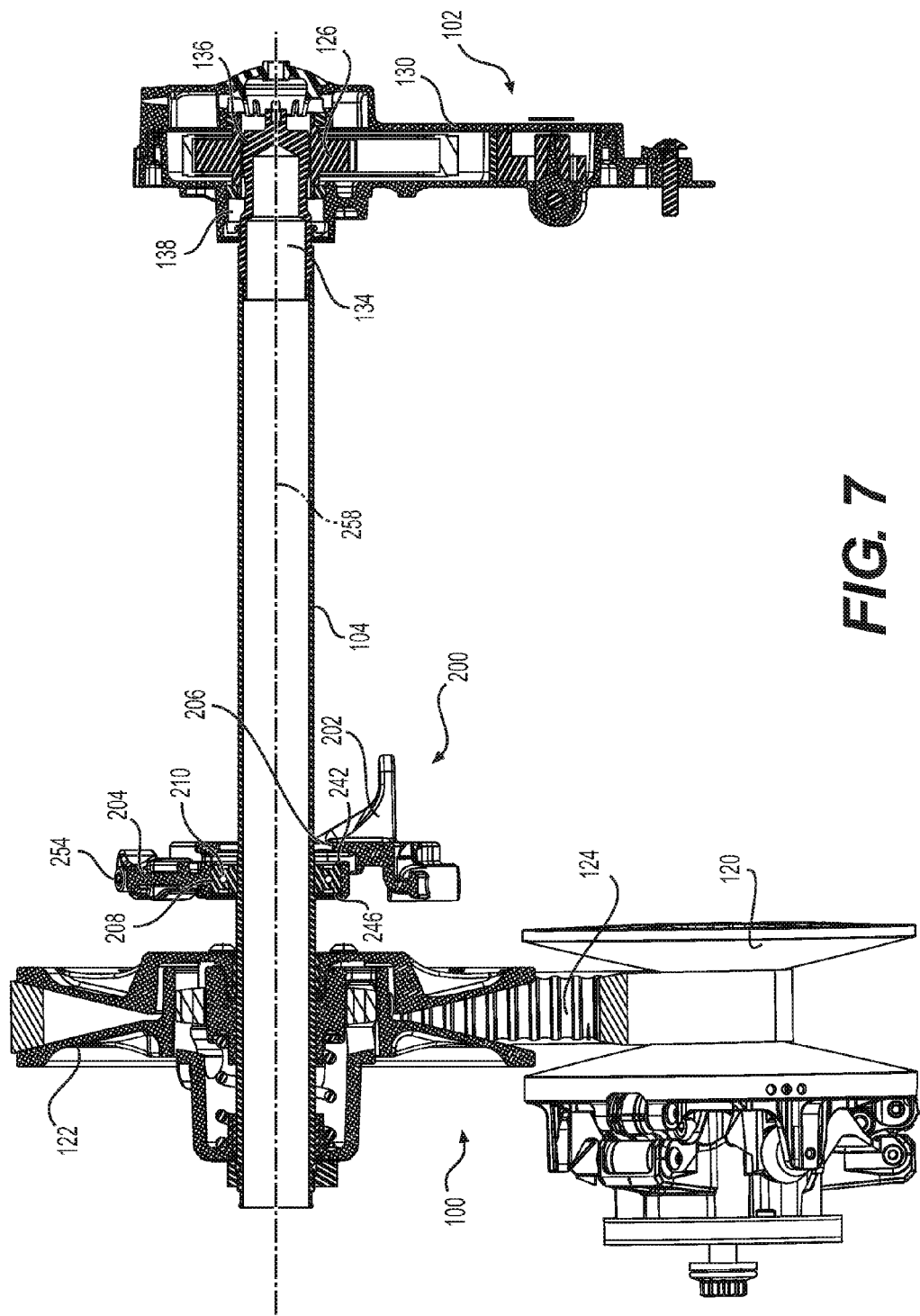
FIG. 7 is a cross-sectional view of the components of FIG. 5 taken through line 7-7 of FIG. 6.

As best seen in FIG. 7, the right end of the countershaft 104 receives a sprocket shaft 134. One end of the sprocket shaft 134 is press-fitted in the countershaft 104 and is then welded to the countershaft 104. The other end of the sprocket shaft 134 has crown splines 136 and extends inside the reduction gearing 102. The sprocket 126 has internal splines and is mounted on the splined end of the sprocket shaft 134. A bearing 138 rotationally connects the sprocket shaft 134, and therefore the countershaft 104, to the housing 130 of the reduction gearing 102. The bearing 138 and the crown splines 136 allow for inclination of the countershaft 104 while continuously engaging the sprocket 126. In one implementation, the bearing 128 is a spherical bearing.

Turning now to FIGS. 4 and 7, the CVT mounting assembly will be described in more detail. As can be seen in FIG. 4, a bracket assembly 200 is joined to the engine 24. The bracket assembly 200 rotationally supports the countershaft 104 to which the driven pulley 122 is mounted. The bracket assembly 200 includes a bracket 202 and a bracket 204. The bracket 202 is rigidly connected to the engine 24. The bracket 204 is resiliently mounted to the bracket 202 as will be described below. The bracket 202 defines an aperture 206 through which the countershaft 104 passes as can be seen in FIG. 7. The bracket 204 defines an aperture 208. When the snowmobile 10 is at rest and the engine 24 is not in operation, the aperture 208 is coaxial with the aperture 206 through which the countershaft 104 also passes as can be seen in FIG. 7. A ball bearing 210 (FIG. 7) is inserted in the aperture 208 radially between the bracket 204 and the countershaft 104 so as to rotationally support the countershaft 104 in the bracket 204. As a result of the above arrangement, the countershaft 104 is connected to the engine 24 but the resilient connection between the bracket 204 and the bracket 202 help reduce the transfer of vibrations from the engine 24 to the countershaft 104, and therefore to the driven pulley 122 and to the frame 16.

Turning now to FIGS. 8 to 11, the bracket assembly 200 will be described in more detail. A lower portion of the bracket 200 defines four apertures 212, 214, 216, 218 (aperture 218 being shown in FIG. 5). Four fasteners 220 (only two being shown in FIG. 4) are inserted through the apertures 212, 214, 216, 218 and into corresponding threaded apertures (not shown) defined in the cylinder block 222 of the engine 24. As a result, the bracket 202 is rigidly connected to the cylinder block 222. It is contemplated that the bracket 202 could be provided with more or less than four apertures 212, 214, 216, 218 and that the cylinder block 222 would then be provided with a corresponding number of threaded apertures. It is also contemplated that instead of being fastened to the cylinder block 222, the bracket 202 could be fastened to another portion of the engine 24. It is also contemplated that the bracket 202 could be integrally formed with the cylinder block 222 or some other component of the engine 24.

Figure 8:
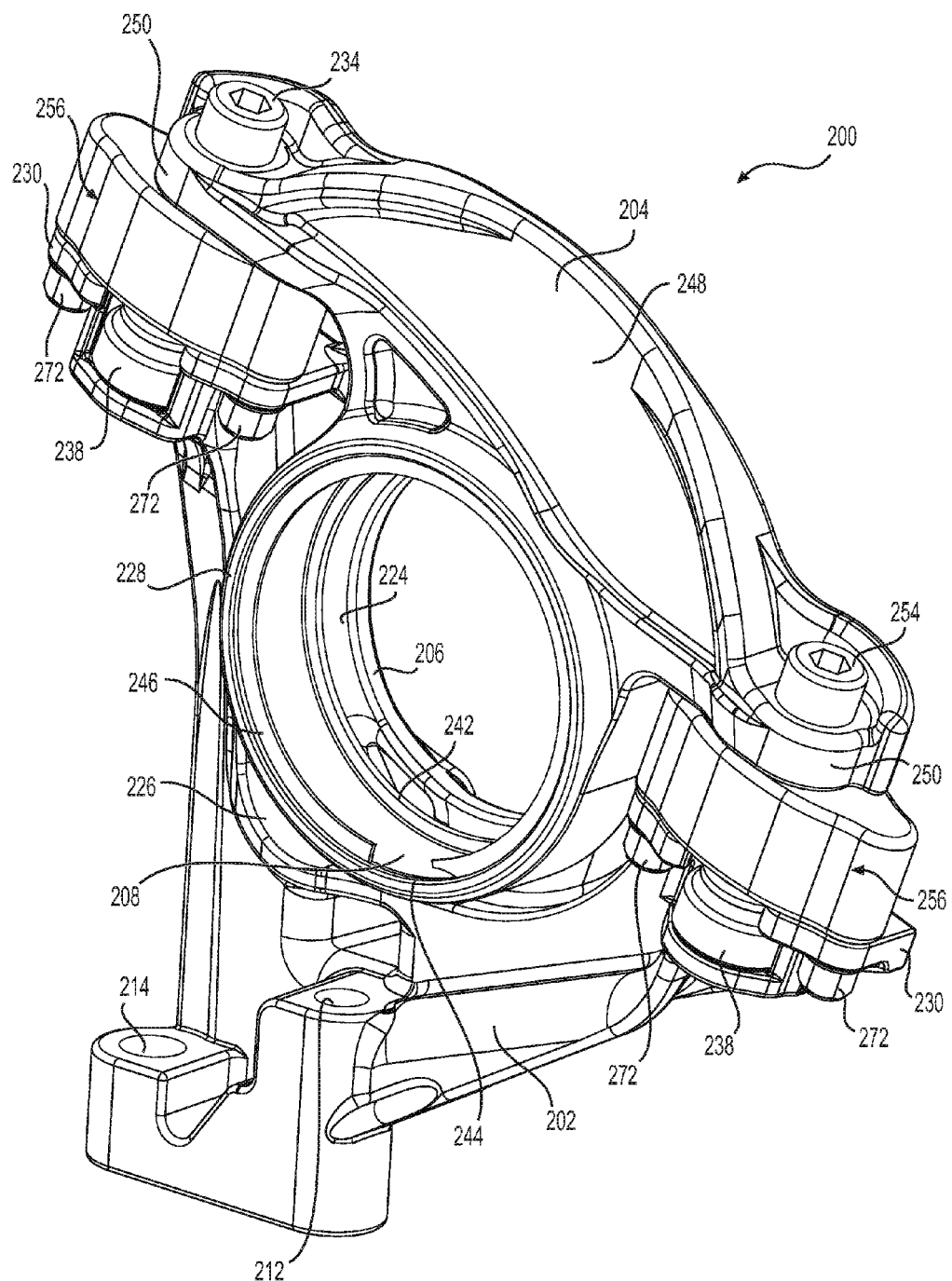
FIG. 8 is a perspective view taken from a rear, right side of a bracket assembly for supporting a countershaft of the snowmobile of FIG. 1.
Figure 9:
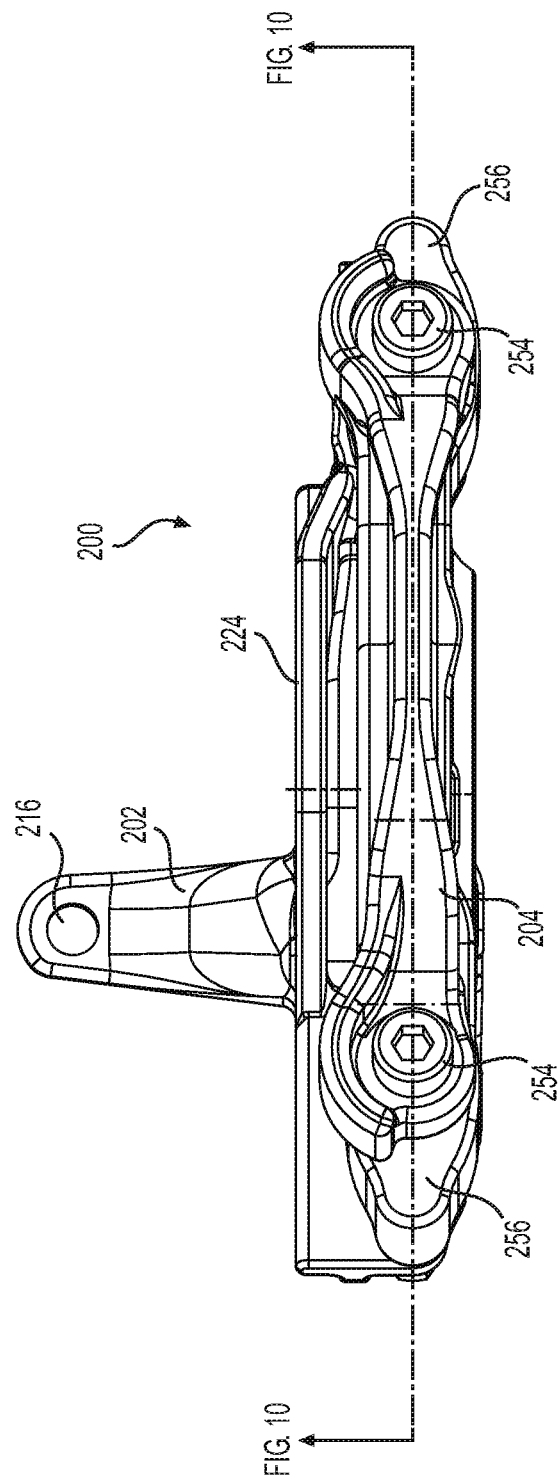
FIG. 9 is a top plan view of the bracket assembly of FIG. 8.

The upper portion of the bracket 202 has a wall 224 in which the aperture 206 is defined. The radius of the aperture 206 is larger than the radius of the countershaft 104, such that as the bracket 204, and therefore the countershaft 104, moves relative to the bracket 202, the countershaft 104 does not come into contact with the edge of the aperture 206. The upper portion of the bracket 202 also has a generally U-shaped wall 226 that extends generally perpendicularly to the wall 224. As best seen in FIG. 8, the wall 226 and the wall 224 define a space that receives a cylindrical portion 228 of the bracket 204 which defines the aperture 208.

Figure 11:
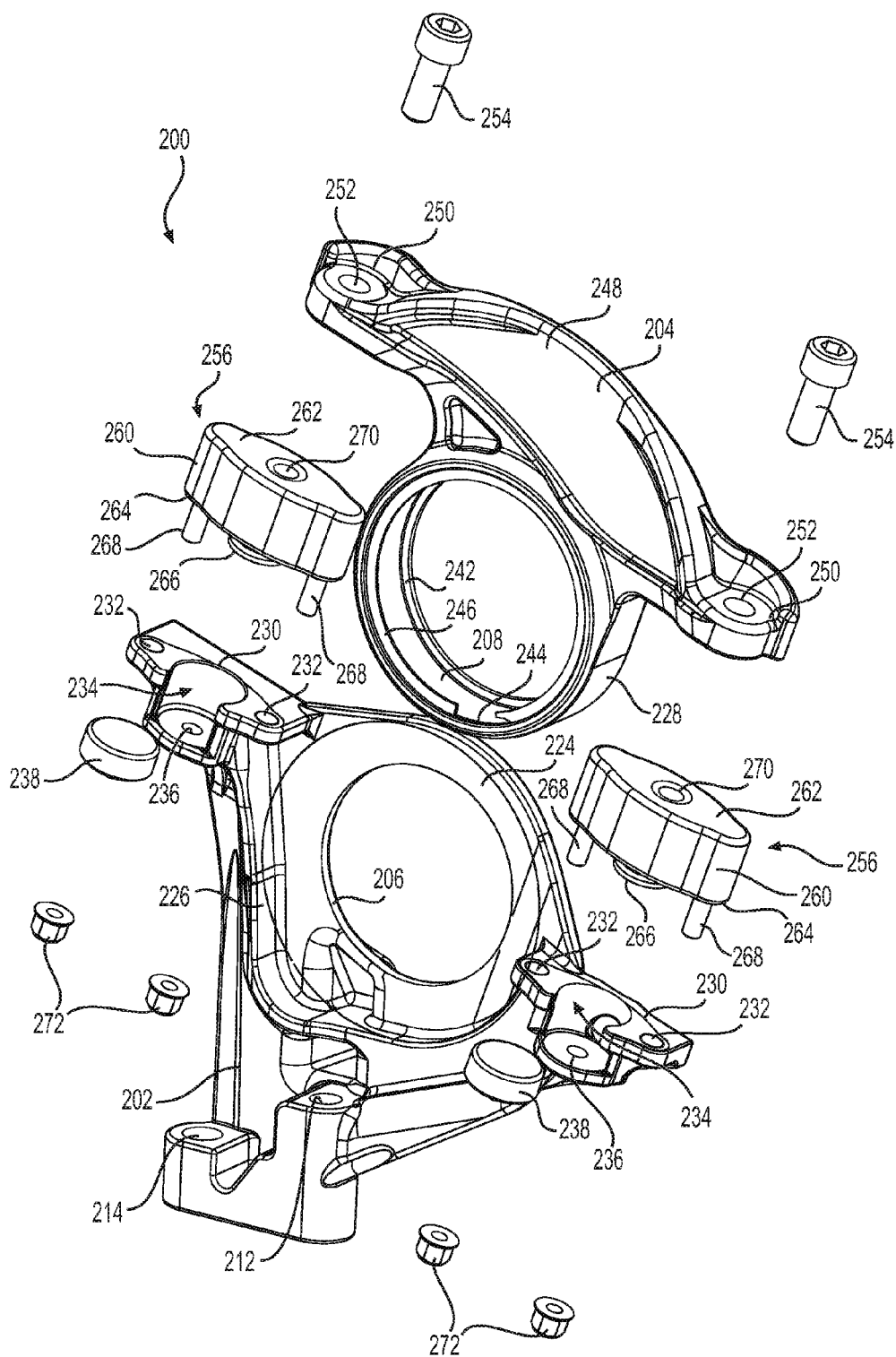
FIG. 11 is an exploded view of the bracket assembly of FIG. 8.

Two tabs 230 extend from the upper ends of the wall 226. As can be seen in FIG. 11, each tab 230 defines a pair of apertures 232 in an upper surface thereof. Between the two apertures 232, each tab 230 has a recess 234. Each recess 234 has a circular bottom and a partially circular side wall such that the recess 234 is opened on one side thereof. The circular bottom of each recess 234 defines an aperture 236 in a center thereof.

Figure 10:
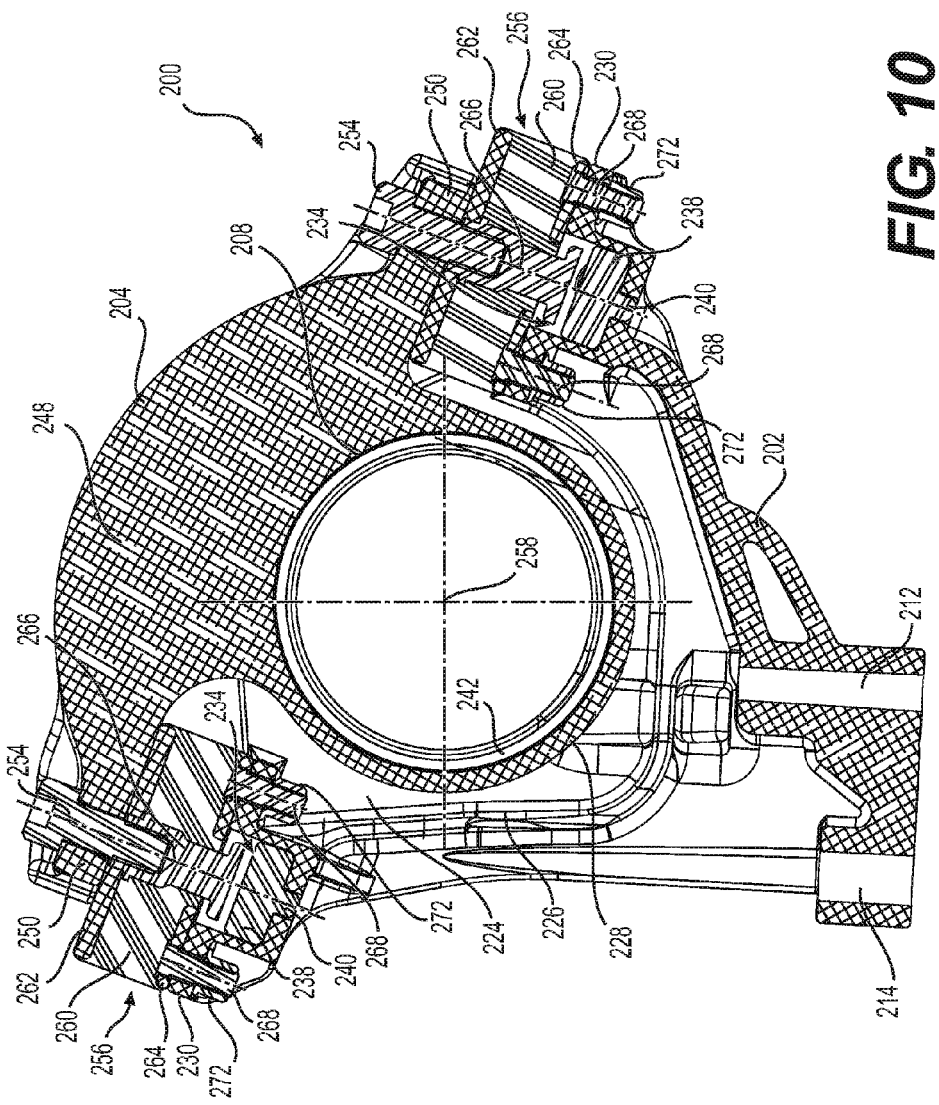
FIG. 10 is a cross-sectional view of the bracket assembly of FIG. 8 taken through line 10-10 of FIG. 9.

Cylindrical bumpers 238 are disposed in the recesses 234 so as to sit on the circular bottoms of the recesses 234 as can be seen in FIG. 10. Each bumper 238 has a pin 240 protruding from a bottom thereof. The pins 240 are press-fit in the apertures 236 in the circular bottoms of the recesses 234 so as to retain the bumpers 238 in the recesses 234. As best seen in FIG. 10, the top of each bumper 238 is lower than the top surface of its corresponding tab 230. The bumpers 238 are made of a relatively hard resilient material such as polyurethane for example.

The lower portion of the bracket 204 has the cylindrical portion 228 defining the aperture 208. As best seen in FIG. 8, the side of the cylindrical portion 228 nearest the wall 224 of the bracket 202 defines a flange 242 extending in the aperture 208. The other side of the cylindrical portion 228 defines a groove 244 that receives a C-clip 246 therein. As can be seen in FIG. 7, the bearing 210 is disposed in the aperture 208 defined in the cylindrical portion 228 and abuts the flange 242 on one side thereof and the C-clip 246 on the other side thereof. It is contemplated that the bearing 210 could be held in the cylindrical portion 228 of the bracket 204 in other ways. For example, it is contemplated that groove 244 and the C-clip 246 could be omitted and that the bearing 210 could be press-fit in the aperture 208 of the cylindrical portion 228. The upper portion of the bracket 204 has an arcuate bar 248 connected to the top of the cylindrical portion 228. Tabs 250 are formed in the ends of the bar 248. Each tab 250 defines an aperture 252 (FIG. 11) used to receive a fastener 254 for connecting the bracket 204 to the bracket 202 as will be described below.

The upper bracket 204 is connected to the lower bracket 202 via a pair of resilient mounts 256 disposed between the brackets 202, 204. More specifically, each resilient mount 256 is disposed between one of the tabs 230 of the bracket 202 and one of the tabs 250 of the bracket 204. As can be seen in FIG. 10, the resilient mounts 256 are disposed on opposite sides of the axis of rotation 258 of the countershaft 104. It is contemplated that only one or more than two resilient mounts could be provided, in which case, their structure may differ from the one described below. It is also contemplated that the lower bracket 202 could be omitted and that one or more resilient mounts, which may have a structure that differs from the one described below, could be used to mount the bracket 204 directly to the engine 24

As both resilient mounts 256 are identical, only one of them will be described herein. As can be seen in FIG. 10, the resilient mount 256 has a damper 260 disposed between two plates 262, 264, a stopper 266 and a pair of studs 268. The studs 268 are connected to the plate 264 so as to extend from a bottom thereof. It is contemplated that only one or more than two studs 268 could be provided. The studs 268 are press-fit in apertures in the plate 264, but it is contemplated that they could be connected by other means such as by welding, bonding or by being integrally formed with the plate 264. The lower portion of the studs 268 is threaded. The plate 262 has a central aperture inside which the stopper 266 is press-fit. It is contemplated that the stopper 266 could be connected to the plate 262 by other means such as by welding, bonding or by being integrally formed with the plate 262. The plate 262 is disposed on top of the damper 260 and the plate 264 is disposed on the bottom of the damper 260. The damper 260, the plates 262, 264, the stopper 266 and the studs 268 are all connected together during the vulcanization process used to make the damper 260. The damper 260 is made of a resilient material, such as rubber for example. The material used for the damper 260 is more resilient than the material used for the bumper 238. In one implementation, the damper 260 has a Shore A durometer of 60 and the bumper 238 has a Shore A durometer of 90, but other durometer values are contemplated.

As can be seen in FIG. 11, the stopper 266 defines an aperture 270 in a top thereof. The aperture 270 is internally threaded. From the plate 262, the stopper 266 extends through the damper 260, through an aperture in the plate 264 and extends from a bottom of the resilient mount 256.

The plate 264 of the resilient mount 256 is disposed on the tab 230 of the bracket 202 such that the studs 268 are received in the apertures 232 of the tab 230 and extend through the tab 230. Nuts 272 are fastened to the threaded ends of the studs 268, thereby fastening the bracket 202 to the resilient mount 256. The tab 250 of the bracket 204 is disposed on the plate 262 of the resilient mount 256 such that the aperture 252 of the tab 250 is aligned with the aperture 270 of the stopper 266. The threaded fastener 254, which in the present implementation is a socket head bolt, is inserted through the aperture 252 and into the aperture 270 to be fastened to the stopper 266, thereby fastening the bracket 204 to the resilient mount 256. It is contemplated that other types of fasteners could be used.

As can be seen in FIG. 10, in the assembled bracket assembly 200, the lower ends of the stoppers 266 are received in the recesses 234 of the tabs 230 of the bracket 202. When the engine 24 is not operating, the stoppers 266 are spaced from the bumpers 238 and the cylindrical portion 228 of the bracket 204 is spaced from the wall 226 of the bracket 202 as shown in FIG. 10. When the engine 24 operates, the tension in the drive belt 124 pulling the driving and driven pulleys 120, 122 toward each other and the vibrations caused by the engine 24 cause the dampers 260 to deform and the brackets 202, 204 move relative to each other. In the case of large vibrations or impacts between the snowmobile 10 and the ground that cause the engine 24 to substantially compress the engine mounts 106, 108, 110, and thus cause a substantial compression of the dampers 260, the stoppers 266 come into contact with the bumpers 238 to limit further compression of the dampers 260, thereby preventing the cylindrical portion 228 of the bracket 204 from coming into contact with the wall 226 of the bracket 202. The stoppers 266 coming into contact with the bumpers 238 also limit the misalignment between the driven pulley 122 and the driving pulley 120 by limiting the amount of relative movement between the brackets 202, 204.

The resilient mount 256 described above is only one example of a contemplated type of resilient mount that could be used to resiliently mount the bracket 204 to the bracket 202. Other types of resilient mounts are contemplated.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:
1. A vehicle comprising:
a frame;
an engine connected to the frame;
at least one vibration damper disposed between the engine and the frame;
an output shaft driven by the engine;
a bracket resiliently mounted to the engine, the bracket being resiliently mounted to the frame via the engine;
a countershaft rotationally supported by the bracket;
a driving pulley disposed on the output shaft and rotating therewith;
a driven pulley disposed on the countershaft and rotating therewith;
a drive belt looped around the driving and driven pulleys to transfer torque from the driving pulley to the driven pulley,
the driving pulley, the driven pulley and the drive belt together forming a continuously variable transmission; and
at least one ground engaging member operatively connected to the countershaft.

2. The vehicle of claim 1, further comprising at least one resilient mount mounting the bracket to the engine.

3. The vehicle of claim 2, wherein the at least one resilient mount is two resilient mounts disposed on opposite sides of a rotation axis of the countershaft.

4. The vehicle of claim 1, wherein the bracket defines an aperture and the countershaft passes through the aperture.

5. The vehicle of claim 4, further comprising a bearing disposed in the aperture radially between the countershaft and the bracket.

6. A vehicle comprising:
a frame;
an engine connected to the frame;
an output shaft driven by the engine;
a first bracket;
a second bracket rigidly connected to the engine,
the first bracket being resiliently mounted to the second bracket;
a countershaft rotationally supported by the first bracket;
a driving pulley disposed on the output shaft and rotating therewith;
a driven pulley disposed on the countershaft and rotating therewith;
a drive belt looped around the driving and driven pulleys to transfer torque from the driving pulley to the driven pulley,
the driving pulley, the driven pulley and the drive belt together forming a continuously variable transmission; and
at least one ground engaging member operatively connected to the countershaft.

7. The vehicle of claim 6, wherein:
the first bracket defines a first aperture;
the second bracket defines a second aperture coaxial with the first aperture; and
the countershaft passes through the first and second apertures.

8. The vehicle of claim 7, further comprising a bearing disposed in the first aperture radially between the countershaft and the first bracket.

9. The vehicle of claim 6, further comprising at least one resilient mount disposed between the first and second brackets.

10. The vehicle of claim 9, wherein the at least one resilient mount comprises:
a damper;
a first plate disposed between the damper and the first bracket; and
a second plate disposed between the damper and the second bracket; and
wherein the first bracket is fastened to the first plate and the second bracket is fastened to the second plate.

11. The vehicle of claim 10, wherein the at least one resilient mount further comprises:
an internally threaded stopper connected to the first plate and extending through the damper and the second plate; and
at least one threaded stud connected to and extending from the second plate, the at least one stud extending through the second bracket;
wherein the vehicle further comprises:
at least one threaded fastener passing through the first bracket and fastened to the internally threaded stopper of the at least one resilient mount to fasten the first bracket to the at least one resilient mount; and
at least one nut fastened to the at least one threaded stud of the at least one resilient mount to fasten the second bracket to the at least one resilient mount.

12. The vehicle of claim 11, further comprising at least one bumper disposed between the internally threaded stopper of the at least one resilient mount and the second bracket; and wherein a material of the at least one bumper is less resilient than a material of the damper of the at least one resilient mount.

13. The vehicle of claim 9, wherein the at least one resilient mount comprises:
a damper; and
a stopper extending from the damper between the damper and the second bracket.

14. The vehicle of claim 13, further comprising at least one bumper disposed between the threaded stopper of the at least one resilient mount and the second bracket; and
wherein a material of the at least one bumper being less resilient than a material of the damper of the at least one resilient mount.

15. The vehicle of claim 9, wherein the at least one resilient mount is two resilient mounts disposed on opposite sides of a rotation axis of the countershaft.

16. The vehicle of claim 1, wherein the driving and driven pulleys are disposed on a first side of the engine; and
further comprising a reduction gearing operatively connected to the countershaft on a second side of the engine opposite the first side.

17. The vehicle of claim 16, further comprising a drive axle operatively connecting the reduction gearing to the at least one ground engaging member.

18. The vehicle of claim 16, wherein the countershaft is connected to the reduction gearing via crown splines.

19. The vehicle of claim 1, wherein the countershaft is disposed rearward and upward of the output shaft.

20. The vehicle of claim 1, wherein the frame includes:
an engine compartment; and
a tunnel rearward of the engine compartment;
wherein the engine is disposed in the engine compartment; and
wherein the at least one ground engaging member is an endless drive track disposed below the tunnel;
the vehicle further comprising:
a front suspension connected to the frame; and
at least one ski connected to the front suspension.

21. The vehicle of claim 6, further comprising at least one vibration damper disposed between the engine and the frame.

22. The vehicle of claim 6, wherein the first bracket defines an aperture and the countershaft passes through the aperture.

23. The vehicle of claim 22, further comprising a bearing disposed in the aperture radially between the countershaft and the first bracket.

24. The vehicle of claim 6, wherein the driving and driven pulleys are disposed on a first side of the engine; and
further comprising a reduction gearing operatively connected to the countershaft on a second side of the engine opposite the first side.

25. The vehicle of claim 24, further comprising a drive axle operatively connecting the reduction gearing to the at least one ground engaging member.

26. The vehicle of claim 24, wherein the countershaft is connected to the reduction gearing via crown splines.

27. The vehicle of claim 6, wherein the countershaft is disposed rearward and upward of the output shaft.

28. The vehicle of claim 6, wherein the frame includes:
an engine compartment; and
a tunnel rearward of the engine compartment;
wherein the engine is disposed in the engine compartment; and
wherein the at least one ground engaging member is an endless drive track disposed below the tunnel;

the vehicle further comprising:
 a front suspension connected to the frame; and
 at least one ski connected to the front suspension.

* * * * *